United States Patent
Iwasa et al.

(10) Patent No.: US 7,217,023 B2
(45) Date of Patent: May 15, 2007

(54) LINEAR LUMINOUS BODY AND LINEAR LUMINOUS STRUCTURE

(75) Inventors: Tadanobu Iwasa, Aichi (JP); Shinji Takano, Aichi (JP)

(73) Assignee: Toyoda Gosei Co., Ltd., Nishikasugai-gun, Aichi (JP)

( * ) Notice: Subject to any disclaimer, the term of this patent is extended or adjusted under 35 U.S.C. 154(b) by 0 days.

(21) Appl. No.: 11/333,253

(22) Filed: Jan. 18, 2006

(65) Prior Publication Data

US 2006/0120104 A1    Jun. 8, 2006

Related U.S. Application Data

(62) Division of application No. 10/629,854, filed on Jul. 30, 2003, now Pat. No. 7,021,809.

(30) Foreign Application Priority Data

Aug. 1, 2002 (JP) ............................. P2002-225145
Nov. 18, 2002 (JP) ............................. P2002-334419
Mar. 28, 2003 (JP) ............................. P2003-090812

(51) Int. Cl.
*B60Q 3/00* (2006.01)

(52) U.S. Cl. ...................... 362/555; 362/551; 362/558; 362/581; 362/576

(58) Field of Classification Search ................ 362/613, 362/551, 555, 558, 577, 582, 581, 576; 385/49
See application file for complete search history.

(56) References Cited

U.S. PATENT DOCUMENTS

| | | | | |
|---|---|---|---|---|
| 4,082,423 A | * | 4/1978 | Glista et al. ................ | 385/103 |
| 5,097,395 A | * | 3/1992 | Aho et al. ................... | 362/551 |
| 5,849,027 A | * | 12/1998 | Gart et al. .................... | 607/93 |
| 6,135,626 A | * | 10/2000 | Glavind ...................... | 362/554 |
| 6,160,948 A | | 12/2000 | McGaffigan | |
| 6,234,656 B1 | | 5/2001 | Hosseini et al. | |
| 6,450,677 B1 | * | 9/2002 | Knauer et al. .............. | 362/551 |
| 6,520,655 B2 | * | 2/2003 | Ohuchi ........................ | 362/612 |
| 6,536,914 B2 | | 3/2003 | Hoelen et al. | |
| 6,637,924 B2 | | 10/2003 | Pelka et al. | |
| 6,786,626 B2 | * | 9/2004 | Wu et al. .................... | 362/555 |
| 6,826,336 B2 | * | 11/2004 | Guy ............................ | 385/49 |
| 6,832,860 B2 | * | 12/2004 | Yoon et al. .................. | 385/88 |
| 6,883,949 B2 | * | 4/2005 | Goto et al. .................. | 362/551 |
| 7,021,809 B2 | * | 4/2006 | Iwasa et al. ................ | 362/555 |
| 2003/0219207 A1 | | 11/2003 | Guy | |

FOREIGN PATENT DOCUMENTS

| | | |
|---|---|---|
| JP | 05-313015 | 11/1993 |
| JP | 08-043638 | 2/1996 |
| JP | 2000-338330 | 12/2000 |

* cited by examiner

*Primary Examiner*—Sandra O'Shea
*Assistant Examiner*—Anabel Ton
(74) *Attorney, Agent, or Firm*—McGinn IP Law Group, PLLC

(57) ABSTRACT

The invention is directed to a linear luminous body comprising: a light source; a light source accommodating portion in which the light source is accommodated; and a light guide held by the light source accommodating portion so as to extend from the light source accommodating portion; wherein a light emitted from the light source is introduced into said light guide through an end surface of said light guide.

12 Claims, 11 Drawing Sheets

LINEAR LUMINOUS BODY AND LINEAR LUMINOUS STRUCTURE

The present Application is a Divisional Application of U.S. patent application No. 10/629,854, filed on Jul. 30, 2003 now U.S. Pat. No. 7,021,809.

The present application is based on Japanese Patent Applications No. 2002-225145, No. 2002-334419 and No. 2003-090812, the entire contents of which are incorporated herein by reference.

BACKGROUND OF THE INVENTION

1. Field of the Invention

The present invention relates to a linear luminous body. For example, the linear luminous body according to the invention is used for interior decoration.

Further, the present invention relates to a structure having linear luminous bodies connected to one another by connectors. For example, the linear luminous structure according to the invention is used for interior decoration, outdoor character advertisement, etc.

2. Related Art

A linear decorative body is used for the purposes of interior decoration, outdoor information display, etc. For example, as this type decorative body, there has been proposed a decorative body (linear luminous body) provided for emitting linear light and formed to have a tubular clad, a core having a refractive index higher than that of the clad, and a reflecting layer provided between the clad and the core (JP-A-2000-338330). In the proposed linear luminous body, high-luminance light transmitted through the core is reflected as high-directivity light by a reflecting surface, so that high-luminance linear light can be obtained. The proposed linear luminous body is however constituted by only a combination of a light guide and a reflecting surface. Accordingly, the strength of the proposed linear luminous body is so low that the proposed linear luminous body cannot be used for the application requiring strength of not lower than a predetermined value.

On the other hand, there is also known a decorative body using a color-painted wire, a wire coated with a colored resin, or the like. For example, the decorative body is used as a partition in a showroom, a restaurant or the like or for decorating a handrail or the like because the decorative body is excellent in strength. When effective decoration needs to be made by use of the decorative body, it is however necessary to illuminate the decorative body from the outside additionally, that is, it is necessary to provide an external light source. Accordingly, the application of the decorative body is limited as a matter of course. In addition, it cannot be said that the decorating effect of the decorative body is high because the decorative body is only colored by receiving light emitted from the external light source.

As another linear decorative body, there has been proposed a decorative body having light-emitting diodes (LEDs) disposed linearly and sealed with a transparent resin such as silicone. This configuration, however, lacks design characteristic or decorativeness because light is observed as spots. In addition, the strength of the decorative body is so low that the application of the decorative body is limited.

SUMMARY OF THE INVENTION

The invention is developed in consideration of the problem and an object of the invention is to provide a linear luminous body high in decorativeness and excellent in strength.

Further, another object of the invention is to provide a linear luminous structure improved in the degree of freedom for design and having high decorativeness.

To achieve the foregoing object, the invention provides the following configuration.

(1) A linear luminous body comprising:

a light source;

a light source accommodating portion in which the light source is accommodated; and a light guide held by the light source accommodating portion so as to extend from the light source accommodating portion;

wherein a light emitted from the light source is introduced into said light guide through an end surface of said light guide.

Further, the linear luminous body may further include a linear core made of a member selected from the group consisting of a metal, an alloy and a synthetic fiber; a light guide with which a side circumferential surface of the linear core is covered.

According to this configuration, the core made of a metal, or the like, is provided in the light guide, so that sufficient strength can be attained. On the other hand, the light source for introducing light into the light guide is provided, so that the linear luminous body can be decorated with light emitted from the side circumferential surface of the light guide. That is, the linear luminous body which is a decorative member can be decorated with light (direct light) emitted from the linear luminous body per se, so that an excellent decorative effect can be obtained.

Another aspect of the invention is configured as follows.

(2) A linear luminous structure comprising:

a plurality of light sources;

at least one of light source accommodating portion in each of which at least one of the plurality light sources is accommodated; and a plurality of light guides held by the light source accommodating portions so as to extend from the light source accommodating portions;

wherein a light emitted from the light sources is introduced into said light guides through at least one end surface of each light guide, and the light guides are connected to one another through the light source accommodating portions.

Preferably, in the above construction, the linear luminous structure may incorporate at least one connector, each of which includes at least two connection portions for holing the light guides and a body portion that constitutes said light source accommodating portion in which at least one of the light sources corresponding to a number of said connection portions are accommodated, whereby the connector connects at least two light guides to one another.

Alternatively, in the above construction, the linear luminous structure may incorporate the a plurality of connectors and at least one junction block having connector attachment surfaces, wherein each of the plurality of connectors is provided with one connection portion for holding the light guide and a body portion in which the light source is accommodated as the light source accommodating portion, and the connectors are fixed to the joint block at the connector attachment surfaces, so that at least two light guides are connected to one another.

According to the above configurations, the light guides are connected to one another easily so that structures of various shapes can be obtained. On the other hand, light sources are provided in body portions of the connectors so that the light guides can be made luminous when light is introduced into the light guides. That is, the structure having a framework made from the light guides can be made luminous by itself, so that an excellent decorative effect can be obtained.

Respective members (respective elements) of the invention will be described below.

(Linear Core)

The linear core is made of a member selected from the group consisting of a metal, an alloy and a synthetic fiber. For example, iron, copper, silver, stainless steel or brass can be used as the metal or alloy. For example, nylon, vinylon, polyethylene, polypropylene, aromatic polyamide fiber, aramid fiber or carbon fiber can be used as the synthetic fiber.

Preferably, a material excellent in strength and durability is used as the material of the linear core. From this point of view, stainless steel or nylon can be used as an example of the preferred material.

The material of the linear core may be selected in consideration of design characteristic. That is, the linear luminous body according to the invention is typically formed so that the linear core is observed from the outside through the light guide when light is not emitted, and a surface of the linear core is observed as specific design by receiving light when light is emitted. Accordingly, the design of the linear core forms part of the decorativeness of the linear luminous body according to the invention. In other words, the design of the linear luminous body varies according to variation in the design of the linear core per se. Specifically, when a metal or alloy is selected as the material of the linear core, the surface of the linear core is observed as a metallic tone. As a result, the linear luminous body is formed so as to be partially observed as a metallic tone. Incidentally, a half mirror treatment or the like may be applied to the surface of the light guide so that the internal structure (i.e., the surface of the linear core) cannot be observed when light is not emitted. In this case, the surface of the linear core basically has no influence on the decorativeness of the linear luminous body.

To obtain higher strength, the linear core may be preferably provided as a multi-core structure. That is, the linear core may be preferably made of a rope-like structure twisted from a plurality of wire-like members.

The surface of the linear core may be colored or plated or may be coated with vinyl chloride or the like. When the linear core is shaped like a rope as described above, coloring or the like may be applied to surfaces of the wire-like members forming the linear core.

A light-reflective layer (light-reflecting layer) may be formed on a side circumferential surface of the linear core. In this configuration, the light-reflecting layer is interposed between the linear core and the light guide, so that reflection of light in the surface of the linear core can be made efficiently. As a result, the amount of a light-scattering material or the like contained in the light guide with which the linear core is covered can be reduced or dispensed with according to circumstances. On the other hand, when the light-reflecting layer is formed so as to reflect the shape of the linear core (e.g., a twisted spiral shape, a bundle shape of fibers bundled in parallel, etc.), reflected light can be obtained according to the shape of the linear core, so that light emission excellent in design characteristic can be obtained. In addition, because a good light guiding function is obtained on the basis of efficient reflection of light due to the light-reflecting layer, light of the light source can travel to a farther place and, at the same time, luminance of light emitted from a side circumferential surface of the light guide can be uniformized more greatly. Incidentally, for example, the light-reflective layer can be formed by white painting or by vapor deposition of a high-reflectance metal such as aluminum or silver.

The diameter of the linear core is not particularly limited. For example, the diameter of the linear core is selected to be in a range of from about 0.1 mm to about 30 mm, preferably in a range of from about 0.5 mm to about 20 mm, more preferably in a range of from about 1 mm to about 10 mm. Incidentally, if the diameter of the linear core is too small, there is fear that sufficient strength cannot be obtained. If the diameter of the linear core is contrariwise too large, there is fear that decorativeness may be spoiled according to the application. For the selection of the diameter of the linear core, the material used, required strength, and/or the application of the invention can be considered.

The arrangement form of the linear core in the linear luminous body according to the invention is not particularly limited. For example, the linear core can be arranged so as to form a center axis of the linear luminous body. According to this arrangement form, the linear luminous body can be formed so as to be rotationally symmetrical with respect to the linear core as an axis of symmetry, so that it is particularly preferred in use for general purposes.

The linear core may be provided as a multi-core structure. In the multi-core structure, strength can be heightened more greatly. In addition, because the linear core can contribute to decorativeness in the linear luminous body according to the invention as described above, the multi-core structure may be used for achieving different kinds of decorativeness.

(Light Guide)

The light guide is provided so that the side circumferential surface of the linear core is covered with the light guide. Although it is preferable that the light guide adheres closely to the side circumferential surface of the linear core, a gap may be partially or entirely provided between the light guide and the linear core. In addition, a region not covered with the light guide may be present in the side circumferential surface of the linear core.

The material of the light guide is not particularly limited if the material is transmissible to light emitted from the light source. Preferably, the light guide is made of a transparent material (including a transparent and colorless or colored material). It is also preferable that the light guide is made of a material easy in processability and excellent in durability. For example, a light-transmissive resin such as a silicone resin, an urethane resin, a polycarbonate resin or an acrylic resin or another material such as glass can be used as the material of the light guide. The light guide may be made of a combination of two or more different materials.

Concave portions or convex portions may be formed in a surface of the light guide so that the form of emission of light from the surface of the light guide can be changed. For example, part of the surface of the light guide may be shaped like a convex lens so that light can be condensed by the lens effect of the convex lens.

A light-scattering agent may be preferably contained in the light guide. The light-scattering agent is provided for promoting diffusion of light in the light guide to thereby obtain light of more uniform luminance emitted from the surface of the light guide. For example, glass, a metal such as aluminum, a resin different in index of refraction of light from the light guide, silica, or the like, which is a material having a predetermined particle size, can be used as the light-scattering agent. The amount of the light-scattering agent contained in the light guide can be determined in consideration of the size (length) of the light guide, the target light-emitting form, etc. For example, the amount of the light-scattering agent can be selected to be in a range of from about 0.01% to about 0.05% (W/W), preferably in a range of from about 0.01% to about 0.1% (W/W) with respect to the light guide.

A coloring agent such as a pigment may be also contained in the light guide. When the coloring agent is contained, the light guide colored with the coloring agent can be observed to thereby obtain a decorative effect. As a result, decorativeness is improved particularly in the condition that light of the light source is not introduced into the light guide.

A luminous substance maybe further contained in the light guide or a layer containing a luminous substance may be formed on the surface of the light guide. The concept "luminous substance" includes a substance generating phosphorescence or fluorescence (fluorescent substance), a light storage material, and a reflective material (e.g., a high-reflectance metal such as Al, Ag or stainless steel or a metallic film). When, for example, the fluorescent substance is used, the color of light introduced into the light guide from the light source can be changed. The kind of the fluorescent substance allowed to be used is not particularly limited. The fluorescent substance used may be either organic or inorganic. The fluorescent color of the fluorescent substance is not particularly limited either. For example, a fluorescent substance having a fluorescent color selected from red, green and blue which are the three primary colors of light may be used or a fluorescent substance having a fluorescent color formed from an intermediate color between two of the three primary colors of light may be used. A plurality of fluorescent substances may be used in combination. For example, a mixture of a red fluorescent substance, a green fluorescent substance and a blue fluorescent substance may be used.

In use of the fluorescent substance, for example, a layer containing the fluorescent substance may be provided on the side circumferential surface of the light guide. The fluorescent substance-containing layer can be formed by printing or application of fluorescent substance-containing ink or paint or by sticking of a fluorescent substance-containing sheet. Alternatively, the fluorescent substance may be contained in the light guide. In this configuration, fluorescence is generated in the light guide and radiated from the side circumferential surface of the light guide. When the fluorescent substance is contained in the light guide, an organic fluorescent substance may be particularly preferably used as the fluorescent substance. This is because when the organic fluorescent substance is used, the transparency of the light guide can be kept so good that an illuminating effect with a clear sense can be obtained.

When the reflective material is contained in the light guide, a light-emitting form full of variety can be obtained so that part of the light guide that glitters with high luminance is observed.

A UV-absorbing agent (or a UV-scattering agent) may be further contained in the light guide to attain improvement in weather resistance. An organic compound such as a benzophenone compound, a salicylic acid compound or a benzotriazole compound or an inorganic compound such as zinc oxide or titanium oxide may be used suitably selectively as the UV-absorbing agent (or the UV-scattering agent). Incidentally, in the case where the fluorescent substance is contained in the light guide as described above, the amount of the excited fluorescent substance is reduced when the UV-absorbing agent is used in combination with the fluorescent substance. In this case, it is therefore preferable that the UV-absorbing agent is not used or the amount of the UV-absorbing agent used is adjusted within such a range that there is no obstacle to excitation of the fluorescent substance.

The shape of the surface of the light guide is not particularly limited. Typically, the surface of the light guide maybe shaped so that the contour of a section perpendicular to the center axis of the light guide becomes circular. Alternatively, the surface of the light guide may be shaped so that the contour of such a section becomes elliptic, triangular, square, rectangular, rhombic, trapezoidal, star-shaped or polygonal. Incidentally, the sectional shape and size of the light guide need not be uniform as a whole in the lengthwise direction of the light guide.

The light guide may be formed as a multi-layer structure. For example, the light guide may be formed as a two-layer structure made of two materials different in index of refraction of light. In this case, the two-layer structure is formed so that one layer relatively high in index of refraction of light is disposed on the inner side (i.e., on the linear core side) whereas the other layer relatively low in index of refraction of light is disposed on the outer side. In this configuration, diffusion of light in the inner layer is accelerated as well as a good light-guiding function is obtained in the inner layer on the basis of reflection in the interface between the inner layer and the outer layer. As a result, light can be delivered to a region farther from the light source and, at the same time, luminance of light radiated from the surface of the light guide can be uniformized.

A layer made of a material lower in refractive index than the material for forming the light guide may be provided between the linear core and the light guide. In this configuration, the layer serves as a barrier for confining light in the light guide, so that a good light-guiding function is obtained in the light guide. At the same time, the amount of light applied on the surface of the linear core is reduced to reduce the amount of light reflected by the surface of the linear core to thereby attain improvement in design characteristic of the linear luminous body.

For example, a linear member having the linear core and the light guide and provided for forming the linear luminous body according to the invention is produced by the following method. First, the linear core is produced in the same manner as in production of a wire or a wire rope. Then, a light guide material which is melted while adjusted so that the linear core is involved as the center of the light guide material is extruded by an extruder used for production of a resin tube or the like. Then, the light guide material is hardened by a process such as cooling. The light guide may be also formed by another method such as molding.

(Light Source)

The kind of the light source used is not particularly limited. For example, an LED, an electric bulb, a fluorescent lamp, or a cathode-ray tube can be used as the light source. Especially, an LED may be preferably used as the light source. This is because the LED is so small in size that the space for installation of the light source can be reduced to thereby reduce the size of the luminous body. Furthermore, the LED meets the demand for energy saving because electric power consumed by the LED is low. Furthermore, the LED has an advantage that the influence of the LED on members around the LED is small because the amount of heat generated in the LED is small. In addition, the LED is advantageous from the point of view of maintenance because the LED is long-lived. Furthermore, the LED has an advantage that a highly reliable luminous body can be formed because the LED is resistant to vibration and impact.

On the other hand, the LED also has an advantage that the response speed of the LED is high. Accordingly, switching on/off the LED, adjustment of luminance and changing the emitted light color (in the case where an LED capable of emitting light with two or more colors is used) can be made easily and instantaneously. When such characteristic of the LED is used, various light-emitting forms such as a light-emitting form full of variety and an unexpected light-emitting form can be generated. The type of the LED is not particularly limited. For example, various types of LEDs such as a round type LED and a chip type LED can be used. Particularly, an LED provided with a lens for obtaining directivity may be preferably used in order to make light incident onto the light guide efficiently.

The color of light emitted from the light source is not particularly limited. For example, a color such as red, green, blue or an intermediate color therebetween or white can be used. A light source capable of emitting light with two or more colors may be used. In this configuration, the luminous body is formed so that various light-emitting forms can be achieved as well as light can be emitted with a larger number of colors. Specifically, a light source using a multi-color or full-color LED may be used as an example. A device having two built-in light-emitting elements (e.g., a red light-emitting element and a blue light-emitting element) different in emitted light color can be exemplified as the multi-color LED. A device having three built-in light-emitting elements, that is, a red light-emitting element, a green light-emitting element and a blue light-emitting element can be exemplified as the full-color LED.

A plurality of devices such as LEDs, bulbs, fluorescent lamps or cathode-ray tubes may be used for forming the light source. In this case, different kinds of devices (e.g., an LED and a bulb) or devices (e.g., a red LED and a blue LED) different in emitted light color may be used in combination.

When the light source is made of a plurality of LEDs, the LEDs are preferably disposed so that the distance between each LED and the center axis of the linear core is equalized and the distance between two adjacent LEDs is equalized with respect to the LEDs. This is because the distribution of light in the light guide is uniformized by the arrangement of the LEDs so that light little in light emission irregularity can be radiated from the surface of the light guide.

The light source is disposed so that light can be introduced into the light guide through an end surface of the light guide. For efficient introduction of light, the light source is preferably disposed in a position as near the end surface of the light guide as possible. When, for example, the linear luminous body according to the invention is shaped like a straight line so that the introduced light can be guided well in the light guide, the light source is preferably disposed so that the center axis of the linear luminous body is parallel to the optical axis of the light source.

If the amount of light emitted from the light source is insufficient or if a sufficient light-guiding function cannot be obtained, there is a possibility that the distribution of light may be uneven in the light guide. For example, the amount of light in a region far from the light source may be reduced. As a result, there is a possibility that unevenness in illuminance may occur in light radiated from the side circumferential surface of the light guide. In such a case, two or more light sources may be preferably used so that light can be introduced into the light guide through opposite end surfaces of the light guide.

The invention is has a special feature in that the luminous body is linear. The concept "linear" includes not only a straight line shape but also a partially or entirely twisted, bent or curved shape. Examples of the linear shape in the invention include a spiral shape, and a regularly bent shape in which the luminous body is bent at regular intervals.

The luminous body according to the invention can be used widely for indoor or outdoor decoration. Particularly it can be used preferably for the application requiring predetermined strength because sufficient strength can be attained by the linear core. When, for example, the linear luminous body according to the invention is used as a partition for partitioning a space or as a handrail, the space can be presented as a presentation effect of light. When, for example, the linear luminous body according to the invention is used instead of a rope in a construction site for another purpose than the simple purpose of decoration, person's attention in the surroundings can be called to the linear luminous body by light effectively. The luminous body according to the invention can be also used for various applications such as a clothes hanger, a course rope of a swimming pool, a car antenna, and a corner pole.

(Connector)

In the luminous structure of the invention, each connector includes connection portions, and a body portion having built-in light sources. Although the connector is preferably made of a resin in consideration of weight and mold ability, the material of the connector is not particularly limited. For example, rubber or a metal may be used as the material of the connector. Particularly use of a metal is effective in improving durability. In addition, when a metal high in heat conductivity is used, heat generated from the built-in light sources can be given off positively.

A material excellent both in strength and in durability may be preferably used as the material of the connector. From this point of view, stainless steel or nylon can be exemplified as a preferred example of the material. A shape memory alloy or a soft resin may be also used so that the connector can be deformed to an arbitrary shape.

One embodiment of connector in the invention includes at least two connection portions, and a body portion having built-in light sources. As the shape of the connector, there can be used any shape in a range of from a two-dimensional shape such as a straight line shape, an L shape, a T shape, an X shape or a Y shape to a three-dimensional shape constituted by a plurality of three-dimensional vectors expressed in an orthogonal coordinate system with X-, Y- and Z-axes, for example, a solid structure such as a tetrapod. The connection portions are disposed at end portions of sides of the connector respectively in the condition that the connection portions are opened toward the end portions respectively.

The body portion has built-in light sources not smaller in number than the connection portions. The light sources are fixed so as to emit light beams toward the opening sides of the connection portions respectively.

Each connection portion has a sleeve portion into which a corresponding light guide can be fitted so that the fitted light guide is retained, and a pull-off prevention portion for preventing the light guide from pulling out. The length and shape of the sleeve portion can be determined according to the strength and shape of the light guide.

When the strength of the light guide is low, the light guide is apt to be deformed. It is therefore preferable that the sleeve portion is selected to be long enough to retain the structure. It is also preferable that the shape of the inner wall of the sleeve portion is substantially analogous to the sectional shape of the light guide. When, for example, the contour of a section of the light guide is shaped like an ellipse, a triangle, a square, a rectangle, a rhombus, a trapezoid, a star, or a polygon, the shape of the inner wall of the sleeve portion in which the light guide is involved is made analogous to the sectional shape of the light guide.

Various configurations can be freely used if the structure of the stopper is of the type in which the stopper can be inserted easily and has a pull-off prevention effect. There is preferably used a slip-on type connector which is fixed in the condition that the light guide is inserted in the connection portion or a quick connector type assembly in which engagement portions are provided at an end portion of the light guide and at the connection potion respectively so that the engagement portions are engaged with and fixed to each other.

Each light source is built in the body portion of the connector so that light can be introduced into the light guide through an end surface of the light guide. To perform efficient introduction of light, it is preferable that the light guide can be deeply fitted into the connection portion so that the light source can be disposed in a position as near the end surface of the light guide as possible. When, for example, the linear luminous body according to the invention is shaped like a straight line so that the introduced light can be guided in the light guides well, each light source may be preferably disposed so that the center axis of the linear luminous body is parallel to the optical axis of the light source.

In another embodiment of connector in the invention, one connection portion and a body portion having a built-in light source are provided in each connector. An engagement portion is formed on an outer surface of the body portion. A luminous structure can be constructed by fixing one or more connectors to a joint block having at least one connector attachment surface.

As the shape of the joint block, it is not limited specifically so long as having at least one connector attachment surface on its outer surface. It is preferable that the connector attachment surfaces are disposed at vectorial angles different from one another. Typically, the joint block is formed in a substantially cubic shape or rectangular parallelepiped shape. Alternatively it may be formed in a columnar shape having a polygonal shape with a plurality of surfaces.

Further, a plurality of the joint blocks may be provided and adjacent joint blocks may be coupled to each other with a coupling member.

By fixing the connectors to the integrated joint blocks each having common shape or different shapes, various number and attachment modes of the luminous bodies can be produced so that an excellent decorative effect is obtained.

As for attachment structure between a connector to a joint block, an engagement projection may formed on a surface of the connector and the connector is fixed to the joint block by inserting the engagement projections into an attachment recess formed on a connector attachment surface. Alternatively, an engagement projection may be formed on the joint block and inserted into an attachment recess formed on the connector. Such the attachment recess may be formed in a shape of groove or hole.

The luminous body according to the invention can be used widely for indoor or outdoor decoration. Particularly because the light guides can be connected to one another by connectors of various shapes having built-in light sources, the luminous body can be used preferably for the application requiring an optical structure complex in shape and high in luminance. When, for example, a character advertisement is formed instead of a neon sign, the advertising effect of attracting public attention can be enhanced by full-color display as well as the characteristic, such as power saving and long life, of LED light sources can be used wisely.

When a three-dimensional solid structure is formed on the basis of the connectors, a complex-shape object for the purpose of decoration can be produced.

The configuration of the invention will be described below in more detail on the basis of an embodiment thereof.

DETAILED DESCRIPTION OF THE PREFERRED EMBODIMENTS

The configuration of the invention will be described below in more detail on the basis of the following embodiments.

Embodiment 1

Figure 1:
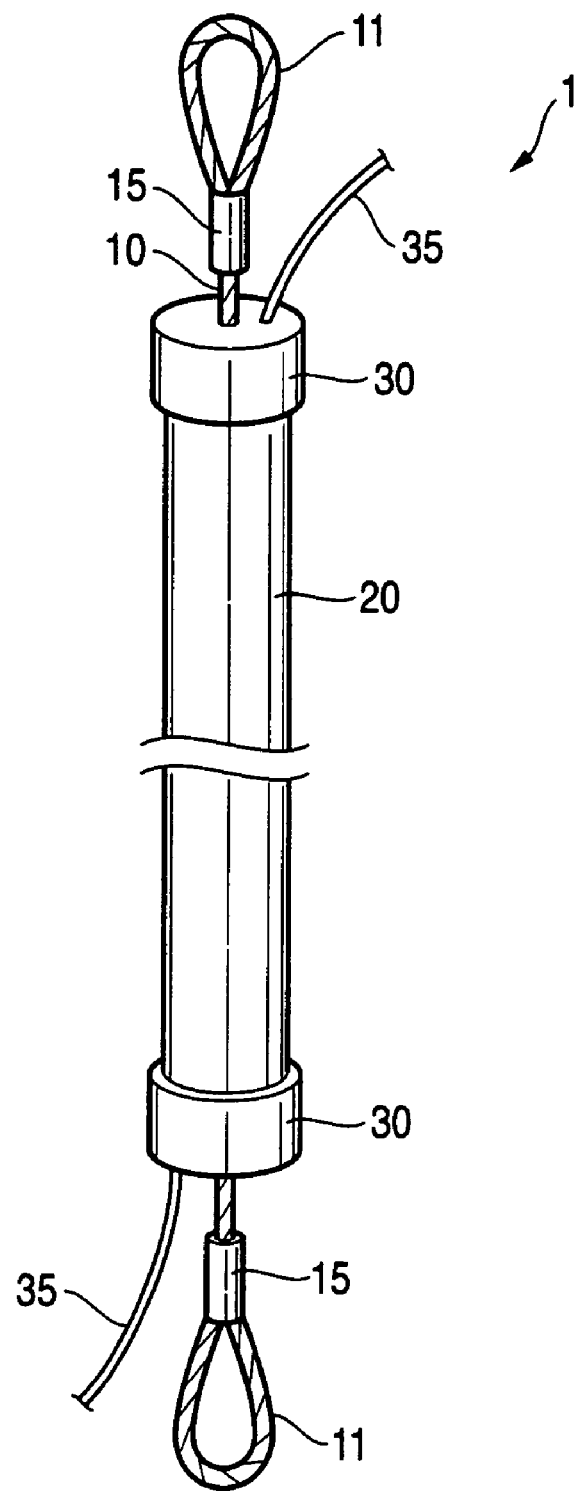
FIG. 1 is a perspective view of a linear luminous body 1 according to Embodiment 1 of the invention.
Figure 2:
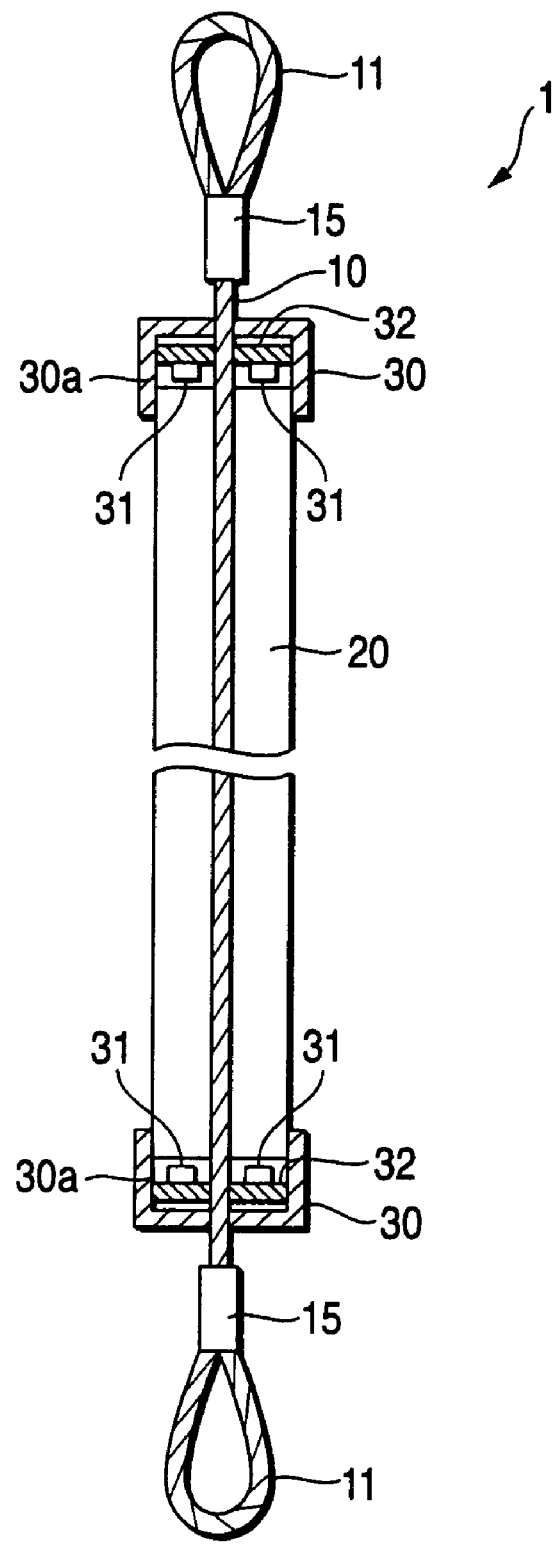
FIG. 2 is a longitudinal sectional view of the linear luminous body 1.

FIG. 1 is a perspective view of a linear luminous body 1 according to an embodiment of the invention. FIG. 2 is a longitudinal sectional view showing the internal structure of the linear luminous body 1. For example, the linear luminous body 1 is used as a partition.

Roughly, the linear luminous body 1 includes a wire rope 10, a light guide 20, and light source units 30. The wire rope 10 is braided from a plurality of wires made of stainless steel. The wire rope 10 has a diameter of about 2 mm and a total length of about 2 m. Hooks 11 are formed at upper and lower ends of the wire rope 10 respectively so that the hooks 11 are used for installation of the linear luminous body 1.

Figure 3:
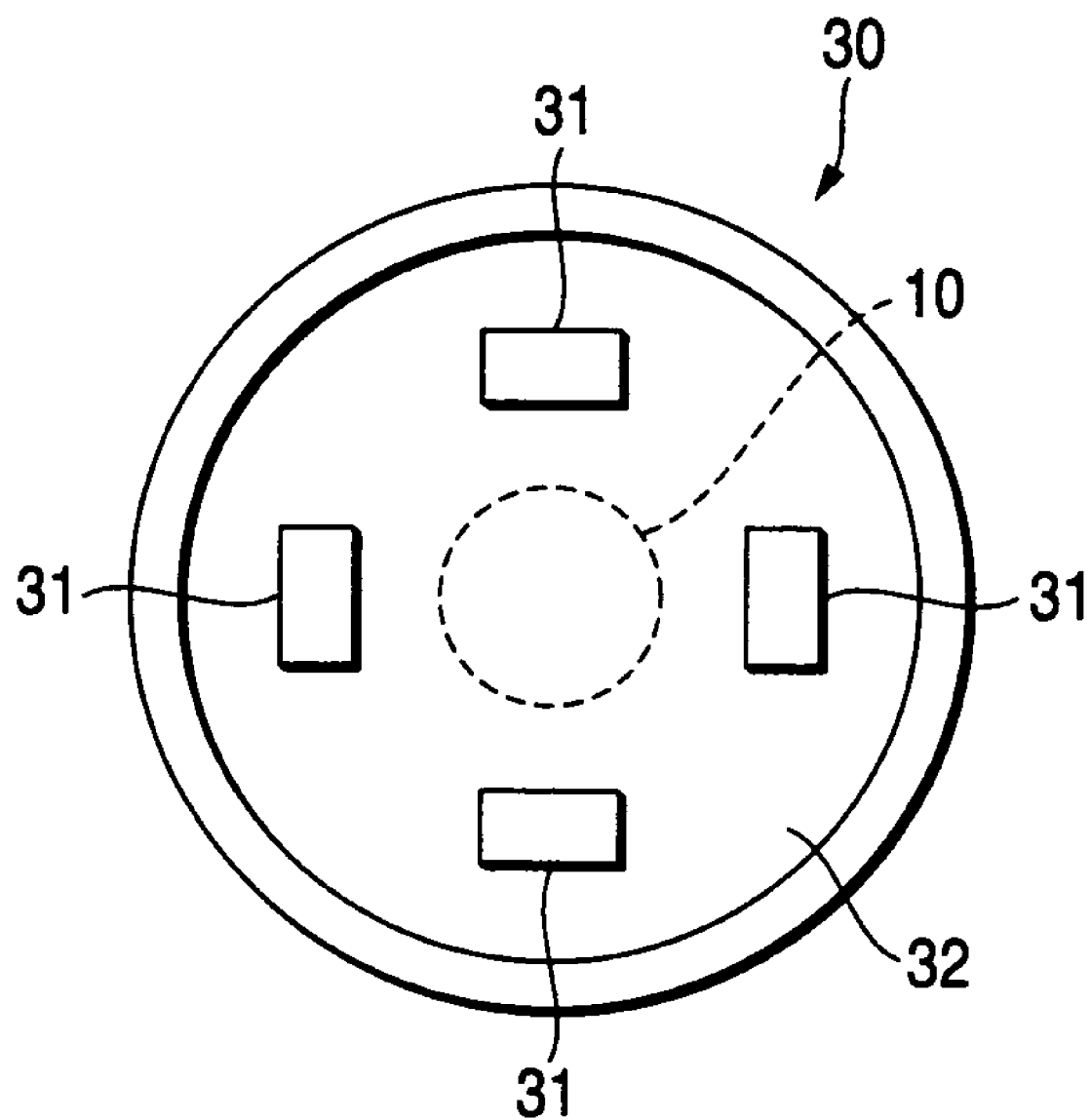
FIG. 3 is a plan view showing the structure of one of light source units 30 used in the linear luminous body 1.

The wire rope 10 except its upper and lower end portions is covered with the light guide 20 so that the wire rope 10 passes through the center of the light guide 20. The light guide 20 is a columnar member made of a silicone resin containing silica as a light-diffusing agent. The light source units 30 are disposed at opposite ends of the light guide 20 respectively. Each of the light source units 30 has four built-in LEDs 31. In this embodiment, a full-color LED having three built-in light-emitting elements, that is, a red light-emitting element, a green light-emitting element and a blue light-emitting element, is used as each LED 31. As shown in FIG. 3, the four LEDs 31 in each light source unit 30 are disposed so that the distance between each LED 31 and the center of the light source unit 30 is equalized and line segments connecting the LEDs 31 to one another form a virtual square. Incidentally, FIG. 3 is a plan view of the light source unit 30 from the light-radiating side (i.e., the light guide side). Thus the light source unit 30 is configured so that the LEDs 31 are accommodated in a housing (light source accommodating portion) 30a.

Electric power is supplied to the respective LEDs 31 through a wiring pattern formed on a surface of a board 32 and a power supply line 35. The light source units 30 are connected to a controller (not shown) by a control line (not shown) so that the lighting state of the light source units 30 is controlled by the controller. Incidentally, elements (not shown) such as protective resistors are disposed on the boards 32 respectively.

The linear luminous body 1 is produced as follows. First, a wire rope 10 of stainless steel is produced by an ordinary method. Then, a light guide 20 is formed of a silicone resin containing a light-diffusing agent by use of an extruder so that the wire rope 10 is involved as the center of the light guide 20. Then, two light source units 30 prepared separately are disposed and fixed so that upper and lower end surfaces of the light guide 20 are covered with the two light source units 30 respectively. Finally, upper and lower ends of the wire rope 10 are fastened with retaining rings 15 to form hooks 11 respectively.

The light-emitting form of the linear luminous body 1 will be described below. First, light beams radiated from the light source units 30 are introduced into the light guide 20 through end surfaces of the light guide 20 facing the light source units 30 respectively. The introduced light beams are guided by the light guide 20 and finally radiated from the side circumferential surface of the light guide 20 to the outside. As a result, the side circumferential surface of the light guide 20 emits light, so that linear light is observed. The color of light radiated from each light source unit 30 may be controlled so that light with various colors can be obtained. The color of light may be also changed continuously or stepwise. On the other hand, the lighting state of each LED 31 may be controlled so that various light-emitting forms such as an intermittent light-emitting form and a light-emitting form with gradually increasing or decreasing luminance can be generated. In this manner, the linear luminous body 1 can provide various presentation effects of light, so that a high decorative effect can be obtained. In addition, because the strong wire rope is involved in the light guide, the linear luminous body 1 has excellent strength and can be used for various applications.

Embodiment 2

Figure 4:
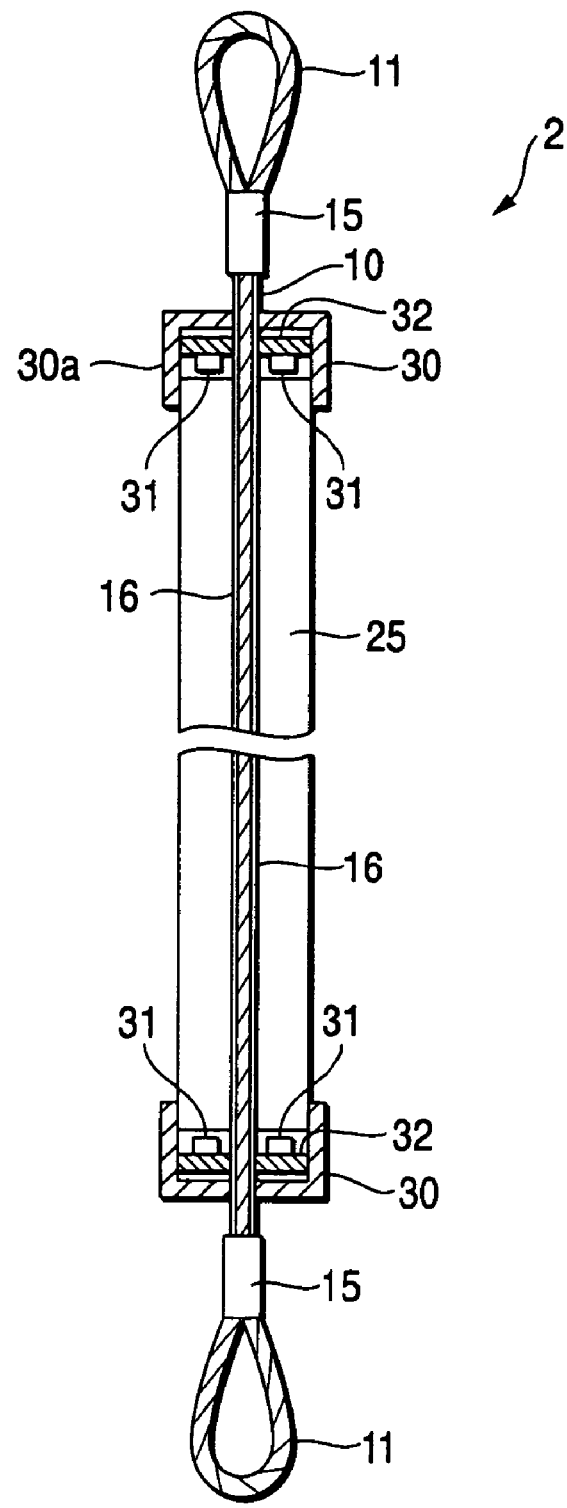
FIG. 4 is a sectional view of a linear luminous body 2 according to Embodiment 2 of the invention.

Another embodiment of the invention will be described below with reference to FIG. 4. FIG. 4 is a sectional view of a linear luminous body 2 according to this embodiment. Incidentally, parts the same as those in the previous embodiment are denoted by the same reference numerals as those in the previous embodiment and the description of the parts will be omitted.

In the linear luminous body 2, a light-reflective layer (light-reflecting film) 16 is formed on a surface of the wire rope 10. The light-reflecting film 16 is formed to have a nearly uniform thickness on the whole. Accordingly, the surface shape of the light-reflecting film 16 reflects the surface shape of the wire rope 10. On the other hand, a light guide 25 is a columnar member made of a silicone resin. Incidentally, the light guide 25 does not particularly contain any light-diffusing agent as an additive.

The linear luminous body 2 is produced as follows. First, a wire rope 10 of stainless steel is produced by an ordinary method. Then, a surface of the wire rope 10 is painted with white ink. Then, a light guide 25 is formed of a silicone resin by use of an extruder so that the wire rope 10 processed in this manner is involved as the center of the light guide 25. Then, upper and lower ends of the wire rope 10 are fastened with retaining rings 15 to form hooks 11 respectively. Finally, two light source units 30 prepared separately are disposed and fixed so that upper and lower end surfaces of the light guide 25 are covered with the two light source units 30 respectively. Incidentally, the linear light guide 2 to which the light source units 30 have been not attached yet and the light source units 30 may be prepared so that the light source units will be attached to the linear light guide 2 on an installation site.

In the linear light guide 2 configured as described above, light beams emitted from the light source units 30 are reflected by the light-reflecting film 16 on the surface of the wire rope 10 in a process in which the light beams are guided in the light guide. Accordingly, diffusion of light in the light guide 25 is accelerated, so that a good light-guiding function can be obtained. As a result, the side circumferential surface of the light guide 25 emits light with nearly uniform luminance, so that linear light is observed.

Embodiment 3

Next, a luminous structure of the invention as Embodiment 3 will be described below with reference to FIGS. 5A through 9C.

Figure 5A:
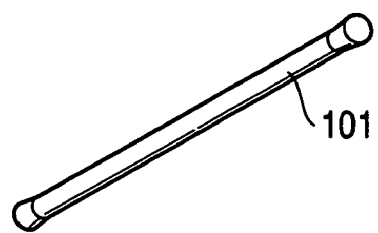
FIGS. 5A and 5B are perspective views of a linear luminous structure 101 according to Embodiment 3 of the invention.
Figure 5B:
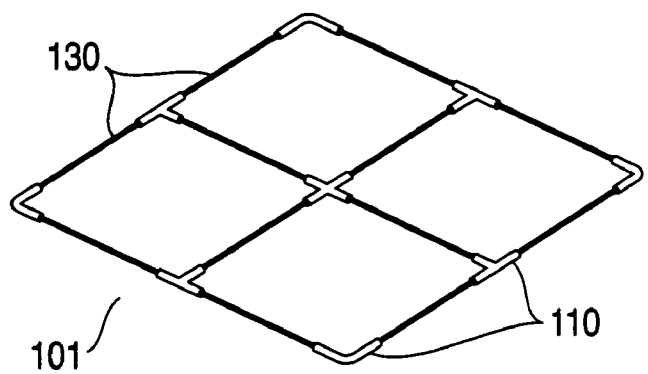
Figure 6:
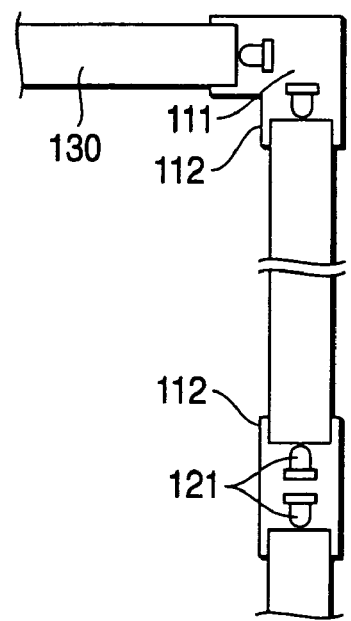
FIG. 6 is a longitudinal sectional view of the linear luminous structure 101.

FIG. 5A is a perspective view of a basic structure of a linear luminous structure 101 according to an embodiment of the invention. FIG. 5B is a view showing an example of the linear luminous structure 101 having light guides combined on a plane so as shaped like a cross in the square, forming a Chinese character. FIG. 6 is a longitudinal sectional view showing the internal structure of the linear luminous structure 101. For example, the linear luminous structure 101 is used as a character advertisement.

Figure 7:
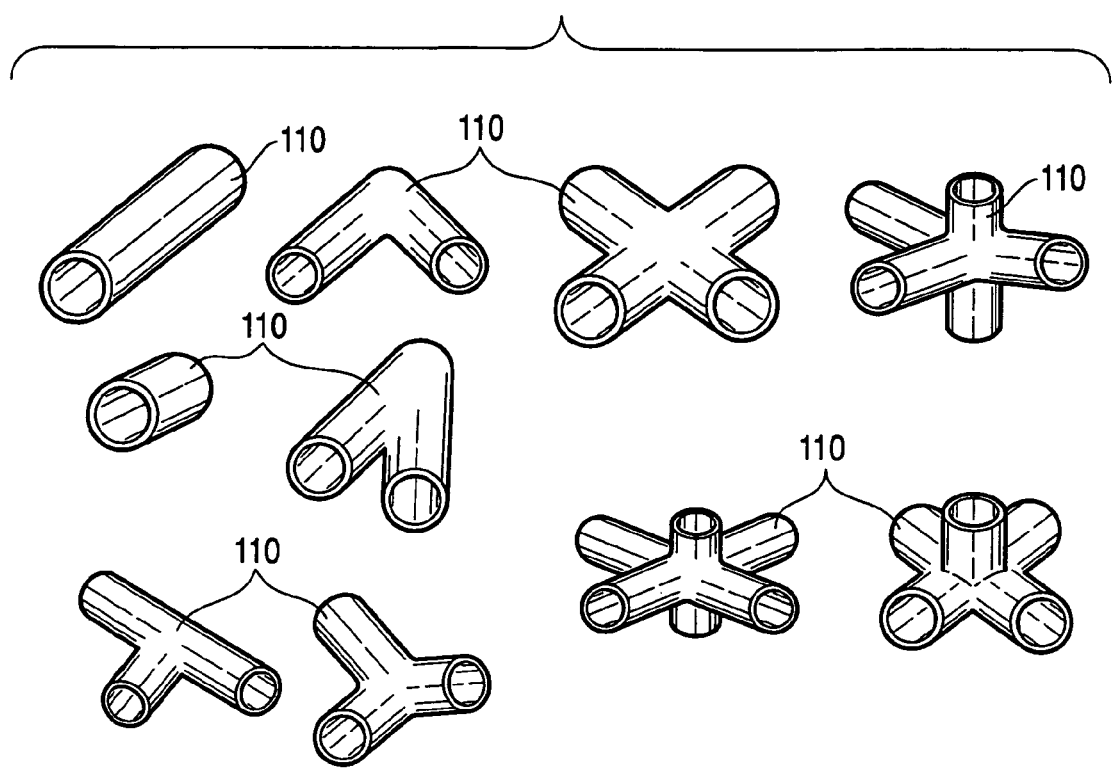
FIG. 7 is a perspective view showing structures of connectors 110 used in the linear luminous structure 101.

Roughly, the linear luminous structure 101 includes connectors 110 served as light source accommodating portion, light source units 120, and light guides 130. The connectors 110 can be shaped variously according to the combination of line segments. That is, the connectors 110 having various shapes such as a straight line shape, an L shape, a T shape, an X shape and a Y shape as shown in FIG. 7 can be combined freely. Incidentally, FIG. 7 is a perspective view of the connectors 110. Each of the connectors 110 includes a body portion 111 formed on the center side of a line segment, and connection portions 112 formed at end portions of the line segment. The body portion 111 has built-in light sources 120. Each of the connection portions 112 has a cylindrical sleeve portion 113 into which a corresponding light guide 130 is fitted and retained, and a pull-off prevention portion 114 for preventing the fitted light guide 130 from pulling out.

Each of the light source units 120 has built-in LEDs 121 of the number corresponding to the number of connection portions 112 in the connector 110. In this embodiment, an LED having a built-in blue light-emitting element is used as each of the LEDs 121. As shown in FIG. 6, the LEDs 121 in each light source unit 120 are disposed so that light beams are radiated from the body portion 111 as the center of the connector 110 toward the connection portions 112 respectively.

Electric power is supplied to each LED 21 through a wiring pattern formed on a surface of a board (not shown) or through a power supply line (not shown). The light source units 120 are connected to a controller (not shown) by a control line (not shown) so that the lighting state of each light source unit 120 can be controlled by the controller. Incidentally, elements (not shown) such as a protective resistor are disposed on the board (not shown).

Each of the light guides 130 is a columnar member made of a silicone resin containing silica as a light-diffusing agent.

The linear luminous structure 101 is produced as follows. First, one end of a light guide 130 cut or curved according to a design is fitted into a connection portion 112 of one connector 110. The other end of the light guide 130 is also fitted into a connection portion 112 of another connector 110. In this manner, a structure can be formed two-dimensionally or three-dimensionally according to the combination of the shapes of connectors 110 and the shapes of light guides 130.

Figure 8:
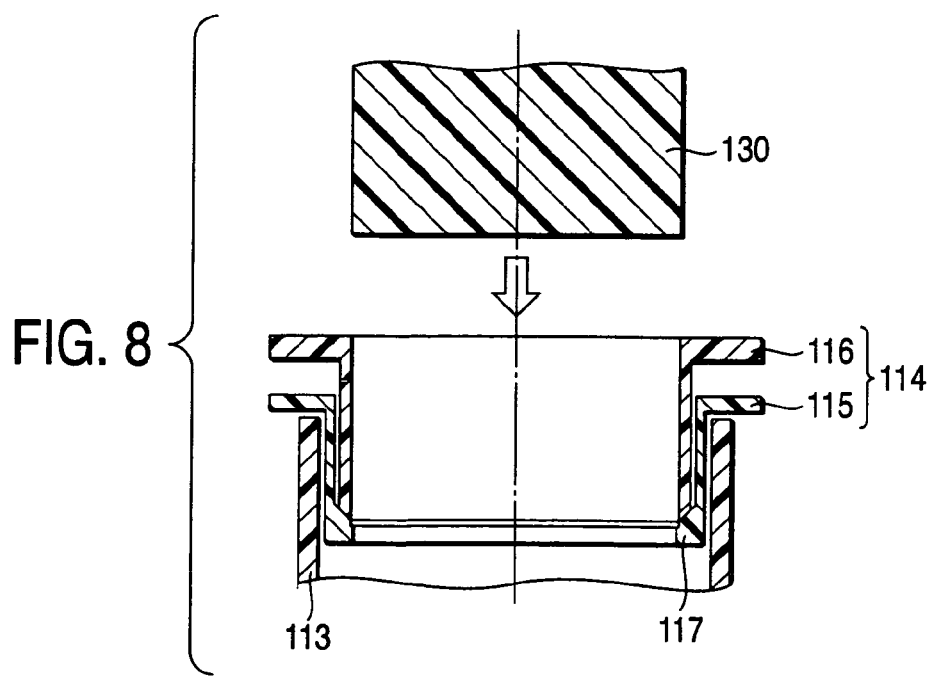
FIG. 8 is an enlarged sectional view showing the structure of a connection portion 112 of a connector 110 used in the linear luminous structure 101.
Figure 9A:
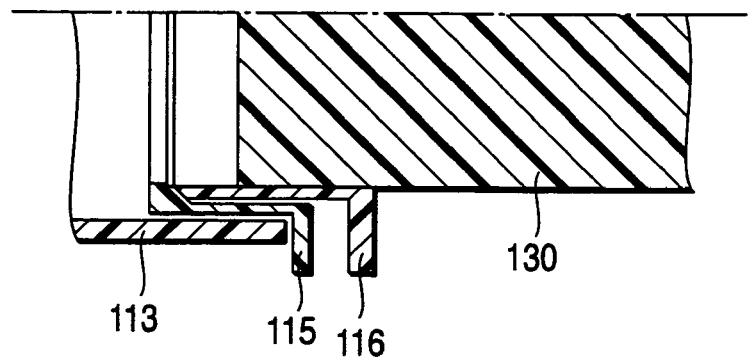
FIGS. 9A to 9C are typical views showing the structure of connection of a connection portion 112 in the linear luminous structure 101.
Figure 9B:
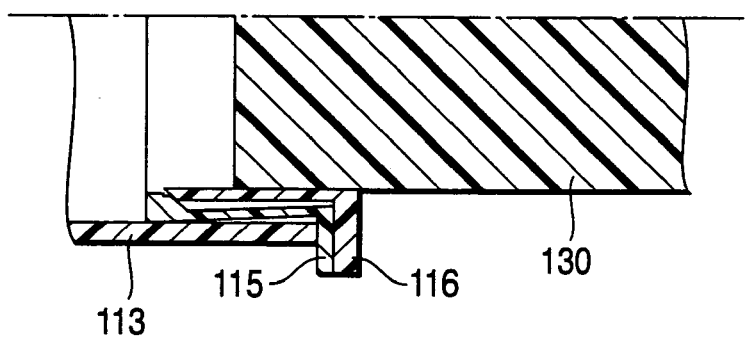
Figure 9C:
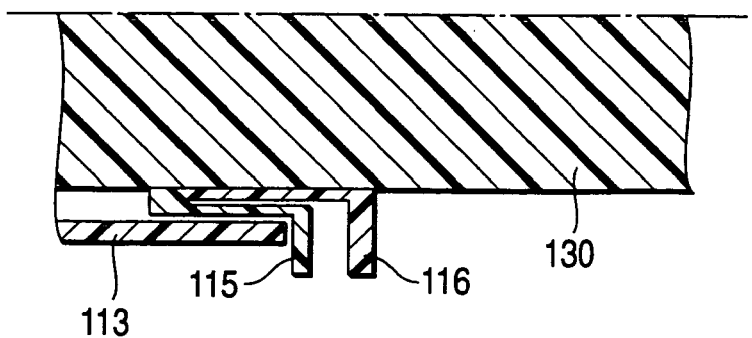

Next, the structure of connection between a connector 110 and a light guide 130 will be described with reference to FIG. 8 and FIGS. 9A to 9C. FIG. 8 is an enlarged sectional view of a connection portion 112 of a connector 110. FIGS. 9A to 9C are views showing forms of connection between a light guide 130 and a connection portion 112.

As shown in FIG. 8, the connection portion 112 has a sleeve portion 113 for retaining the light guide 130, and a pull-off prevention portion 114 provided at an end portion of the connection portion 112. The pull-off prevention portion 114 has a stopper 115 engaged with the light guide 130 when the light guide 130 is fitted into the sleeve portion 113, and a piston ring 116 for enlarging the diameter of the stopper 115 to disengage the light guide 130 from the stopper 115 when the light guide 130 needs to be attached/detached.

FIG. 9A is a view showing a state in which the light guide 130 is fitted into the connection portion 112. When the light guide 130 is fitted into an opening formed in the piston ring 116, the light guide 130 abuts on a pawl 117 of the stopper 115 and gets locked. The paw 117 is tapered toward the opening side. Accordingly, when the light guide 130 is forced into the opening, the diameter of the stopper 115 is enlarged so that the light guide 130 can be fitted into the opening. As shown in FIG. 9B, when the piston ring 116 is pushed toward the connector 110, the diameter of the stopper 115 is enlarged because a front end portion of the piston ring 116 and the pawl 117 of the stopper 115 are tapered to each other. As a result, the light guide 130 can be fitted into the connection portion 112 without resistance. As shown in FIG. 9C, when the piston ring 116 is released in the condition that the light guide 130 is fitted into the connection portion 112 till the light guide 130 abuts on the pawl 117 of the stopper 115, the pawl 117 is engaged with the light guide 130 to prevent the light guide 130 from pulling out. In this manner, the sleeve portion 113 retains the light guide 130.

When the light guide 130 needs to be removed from the connector 110, the piston ring 116 is pushed toward the connector 110 in the same manner as in the case where the light guide 130 needs to be fitted into the connector 110 as shown in FIG. 9B. As a result, the light guide 130 is disengaged from the pawl 117, so that the light guide 130 can be removed.

Next, the light-emitting form of the linear luminous structure 101 will be described. First, light beams emitted from the built-in light source unit 120 of each connector 110 are introduced into corresponding light guides 130 through end surfaces of the light guides 130 facing the light source unit 120 respectively. The introduced light beams are guided by the light guides 130 and finally radiated to the outside from the side circumferential surfaces of the light guides 130 respectively. As a result, the side circumferential surfaces of the light guides 130 are made luminous, so that linear light is observed. The color of light emitted from each light source unit 120 may be controlled so that light with various colors can be obtained. The color of light may be also changed continuously or stepwise. When different colors of light, e.g., blue and red, are introduced into a light guide 130 through opposite ends of the light guide 130, the resulting color of light can be changed gradually from blue to violet or red, so that a gradation effect can be presented. On the other hand, the lighting state of each LED 121 may be controlled so that various light-emitting forms such as an intermittent light-emitting form and a light-emitting form with gradually increasing or decreasing luminance can be generated. In this manner, the linear luminous structure 101 can provide various presentation effects of light, so that a high decorative effect can be obtained.

Embodiment 4

Next, a luminous structure of the invention as Embodiment 4 will be described below with reference to FIGS. 10 through 14B.

Figure 10:
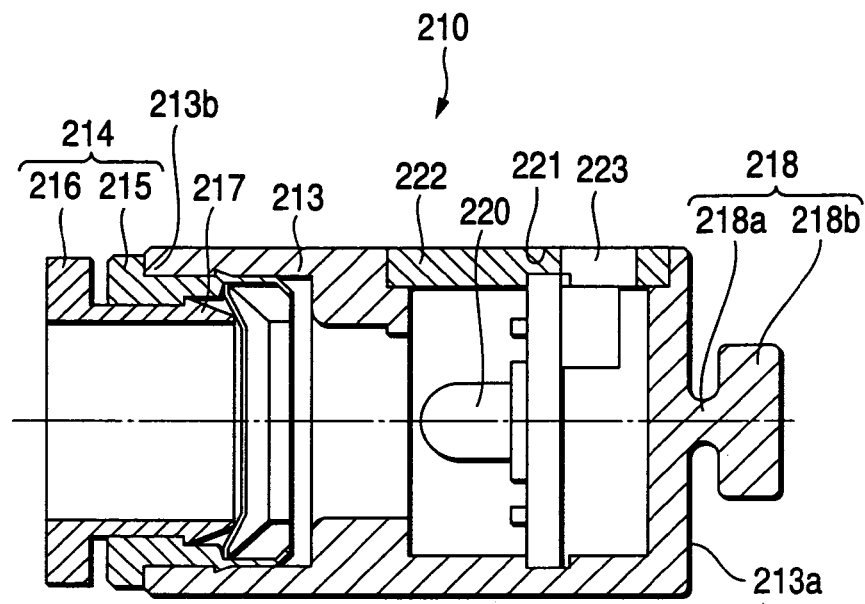
FIG. 10 is a longitudinal cross sectional view of the connector 210 according to Embodiment 4 of the invention.

FIGS. 10 through 12B show a luminous structure of the embodiment constituted by a connector 210 and a joint block 250. FIG. 10 is a longitudinal cross sectional view of the connector 210. FIGS. 11A, 11B and 11C are front view, side view and rear view of the connector 210.

As shown in FIGS. 10, 11A, 11B and 11C, the connector 210, which is served as a light source accommodating portion, is provided with a body portion 213 in which a light source unit 220 is accommodated and a connection portion 214 for connecting and holding a light guide as described in the foregoing embodiments.

An opening 221 through which the light source unit 220 is inserted into the body portion 213, is formed on a side surface of the body portion 213. When the light source unit 220 is mounted in the body portion 213, the opening 221 is closed with the lid member 222. In the lid member 222, a through hole 223 is formed for extending a lead wire (not shown) electrically connected to the light source unit to the outside. The connection portion 214 is attached to a front face of the body portion 213. The connection portion 214 includes a pull of prevention portion provided with an annular stopper 215 fitted to a front opening 213a formed on the front face of the connector 210, a piston ring 216 formed like a flange which is fitted to the stopper 215 and holds the light guide with an inner peripheral surface thereof. In this embodiment, a retaining pawl 217 is formed on a connector-side end of the piston ring 216. The connection portion 214 is configured so that the retaining pawl 217 is engaged with an inner surface of the stopper 215 when the piston ring 216 is pressed to the connector side, thereby preventing the piston ring 216 from pulling off while holding the light guide.

Figure 11A:
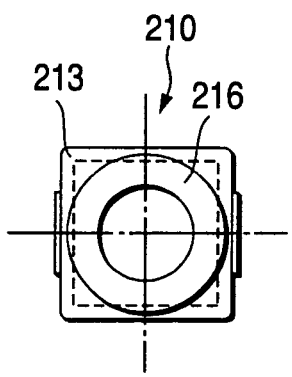
FIGS. 11A, 11B and 11C are front view, side view and rear view of the connector 210, respectively.
Figure 11B:
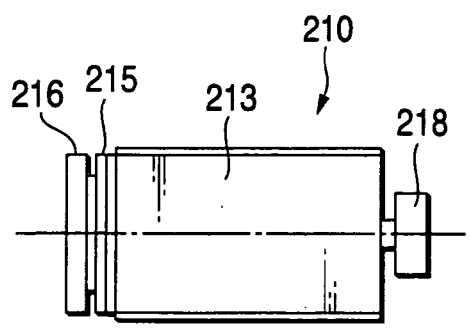
Figure 11C:
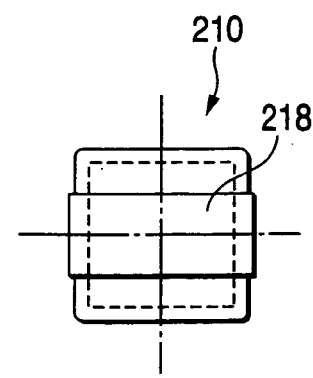

An engagement projection 218 is formed on a rear surface 213b of the body portion 213. As shown in FIGS. 11A through 11C, the engagement projection 218 is formed across opposite side faces of the body portion 213 on the rear surface 213b, having a narrow proximal portion 218a and a wide distal portion 218b.

Figure 12A:
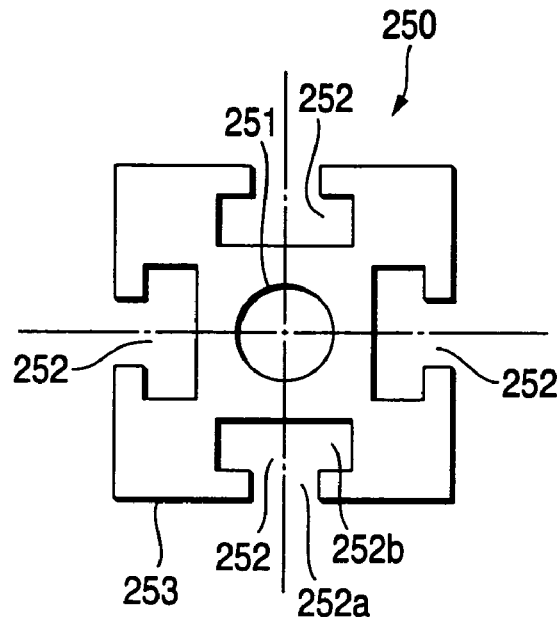
FIGS. 12A and 12B are a plan view and a side view of the joint block 250, respectively.
Figure 12B:
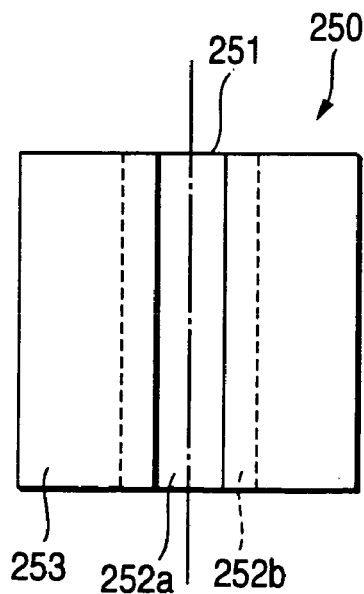

FIGS. 12A and 12B are a plan view and a side view of the joint block 250, respectively. As shown FIGS. 12A and 12B, the joint block has an outer shape substantially of rectangular column, having a circular hole as a center axis and side surfaces served as connector attachment surfaces. On each side surface, an attachment recess 252 is formed so as to be in parallel with the axis. The attachment recess 252 is provided with a narrow communication portion 252a on the surface and a rectangular groove 252b having a wide bottom. When the connector 210 is fixed to the joint block 250, the narrow proximal portion 218a of the engagement projection 218 is inserted into the narrow communication portion 252a, and the wide distal portion 218b of the engagement projection 218 is inserted into the rectangular groove 252b, whereby the engagement projection 218 is fitted to the attachment recess 252. Since the attachment recess 252 is formed across opposite faces of the joint block 250, the engagement projection 218 can be inserted along the axial direction of the joint block 250 from one side face to the opposite one.

Next, another example in which connectors 210A are fixed to a joint block or plural blocks 250A, will be described below. Incidentally, although shapes of the engagement projection and the attachment recess in this example are different from those of the above-described connector 210 and joint block 250, basic structures are similar so that the connector 210A and the joint block 250A can be handled in the same manner for fixing operation.

Figure 13:
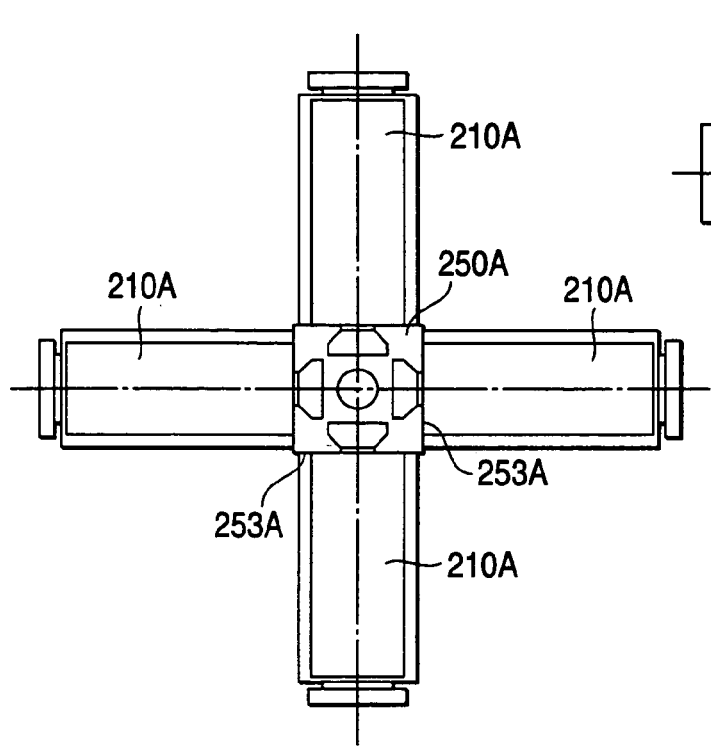
FIG. 13 is an example showing plural connectors 210A are fixed to a single joint block 250A according to Embodiment 4 of the invention.

FIG. 13 is an example showing plural connectors 210A are fixed to a single joint block 250A. That is, four connectors 210A are fixed to all the connector attachment surfaces 253 on the joint block 250A, respectively. Thus in this embodiments, the plural connectors 210A can be selectively fixed to the joint block 250A as desired.

Figure 14A:
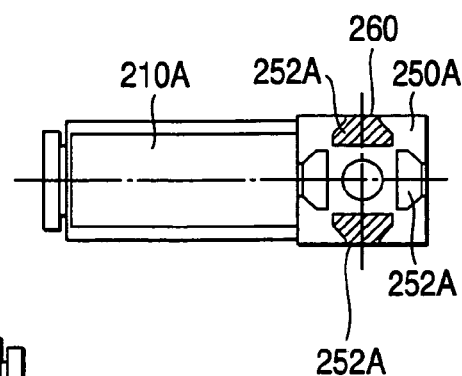
FIGS. 14A and 14B show an example in which plural blocks 250A are stacked and fixed to be an integral body.
Figure 14B:
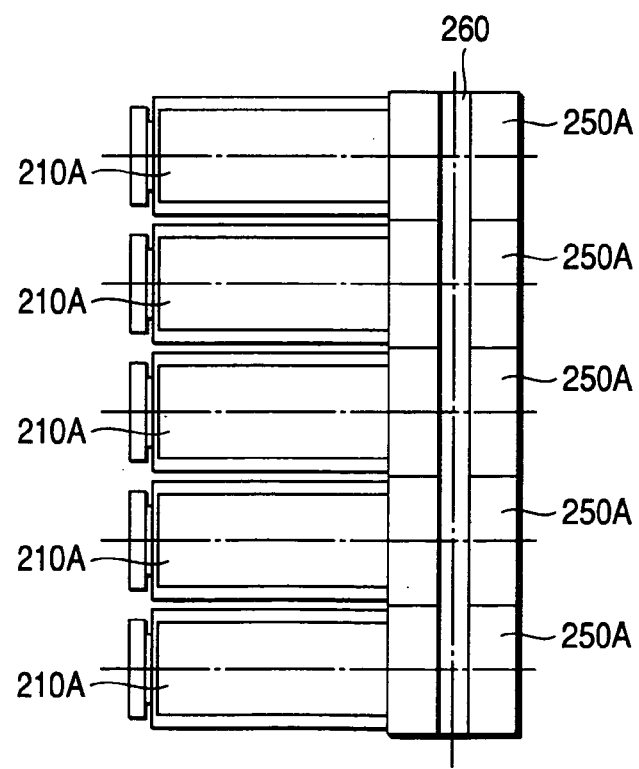

On the other hand, FIGS. 14A and 14B show an example in which plural blocks are stacked and fixed to be an integral body. As shown in FIG. 14A, one connector 210A is fixed to one of the attachment surfaces 253 in each joint block 250A.

Stays 260 with a length are inserted in the attachment recesses 252A formed on two opposite attachment surfaces adjacent to the attachment surface 253 to which the connector 210A is fixed. The stays 260 are served as a coupling member coupling the plural joint blocks 250A which are stacked to one another, by commonly inserted into the attachment recesses 252A in the stacked joint blocks 250A as shown in FIG. 14B.

Figure 15A:
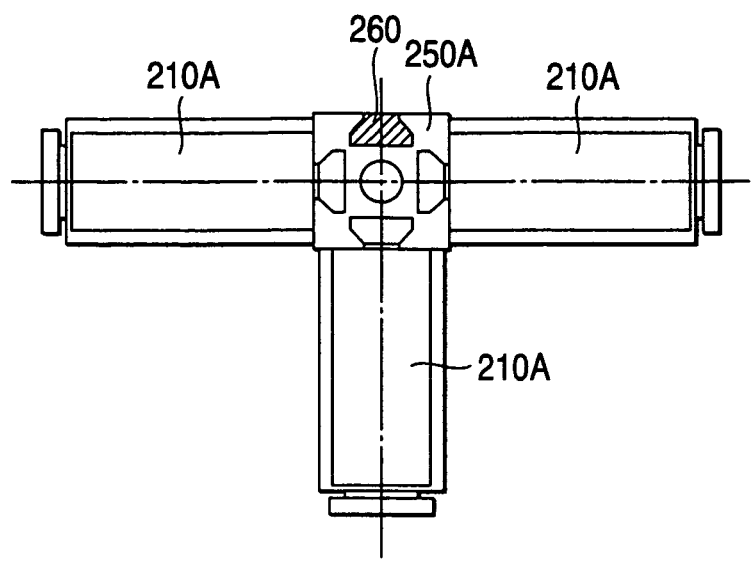
FIGS. 15A and 15B show an example in which a stay 260 is inserted in one of the attachment surface 253, and the connectors 210A are fixed to the other attachment surfaces 253.
Figure 15B:
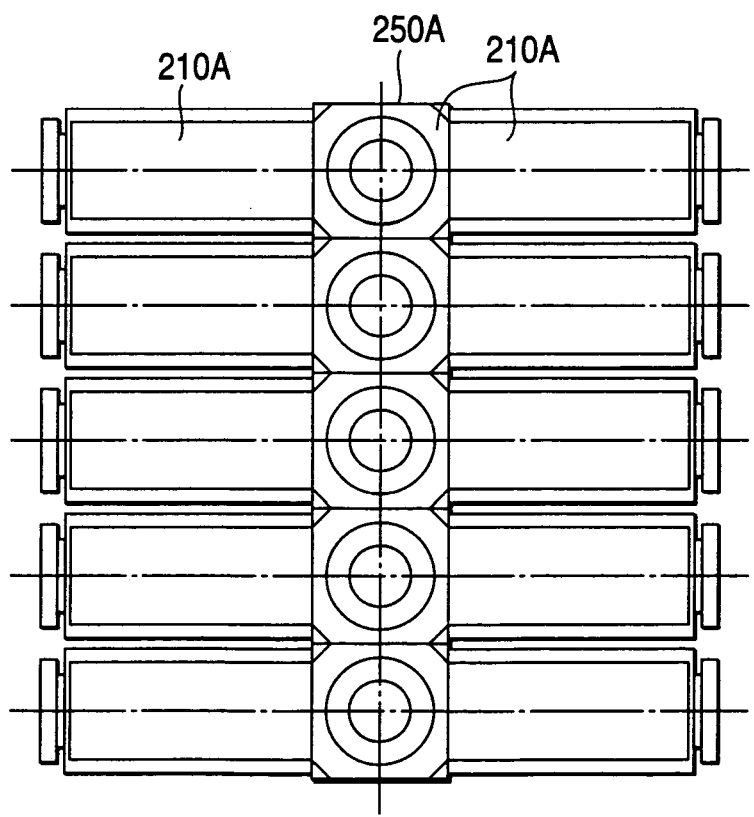

Similarly, FIGS. 15A and 15B show an example in which a stay is inserted in one of the attachment surface 253, and the connectors 210A are fixed to the other attachment surfaces 253.

In the above examples, the connectors 210A and joint blocks 250A are described as having the same shape. However, the invention is not limited this feature. Various shapes of joint blocks may be coupled to one another in combination and connectors having various shapes or illumination modes may be fixed to a single joint block.

Further although the joint blocks are stacked in the axial direction of those joint blocks in the above examples, the joint blocks may be coupled so that the attachment surfaces of the adjacent joint blocks are opposed and abutted to each other.

As described above, luminous structures can be formed by holding light guides with the connectors fixed to the joint blocks. By illuminating the light source units as a desired mode, an excellent decorative effect can be accomplished. Further, more complicated illumination effect can be presented by combining plural joint blocks.

The invention is not limited to the description of the above embodiments. Various modifications that can be easily conceived by those skilled in the art may be included in the invention without departing from the scope of claim for a patent.

What is claimed is:

1. A linear luminous structure comprising:
    a plurality of light sources;
    at least two light source accommodating portions in each of which at least one of the plurality light sources is accommodated; and
    a plurality of light guides held by the light source accommodating portions so as to extend from the light source accommodating portions;
    wherein a light emitted from the light sources is introduced into said light guides through at least one end surface of each light guide,
    wherein the light guides are connected to one another through the at least two light source accommodating portion, and
    wherein two of said light source accommodating portions are connected to opposite ends of one of said light guides to thereby introduce light into said light guide through said opposite ends of said light guide.

2. The linear luminous structure according to claim 1, wherein at least one of said plurality of light sources comprises a light emitting diode.

3. A linear luminous structure comprising:
    a plurality of light sources;
    at least two light source accommodating portions in each of which at least one of the plurality light sources is accommodated; and
    a plurality of light guides held by the light source accommodating portions so as to extend from the light source accommodating portions;
    wherein a light emitted from the light sources is introduced into said light guides through at least one end surface of each light guide,
    wherein the light guides are connected to one another through the at least one light source accommodating portion,
    wherein at least one connector comprises:
        at least two connection portions for holding the light guides; and
        a body portion that constitutes said light source accommodating portion in which at least one of the light sources corresponding to a number of said connection portions are accommodated, and
    wherein the connector connects at least two light guides to one another.

4. The linear luminous structure according to claim 3, wherein said connection portions of said at least one connector are disposed at vectorial angles different from one another.

5. The linear luminous structure according to claim 3, wherein a pull-off prevention portion is provided at end portions of said connection portions, and said pull-off prevention portion comprises:
- a stopper fixed to the body portion; and
- a piston ring for holding said light guide,
- wherein when said piston ring is pressed into said stopper, a diameter of said stopper is enlarged to thereby disengage said stopper from said light guide.

6. A linear luminous structure comprising:
- a plurality of light sources;
- at least two light source accommodating portions in each of which at least one of the plurality light sources is accommodated;
- a plurality of light guides held by the light source accommodating portions so as to extend from the light source accommodating portions;
- a plurality of connectors; and
- at least one junction block having connector attachment surfaces,
- wherein a light emitted from the light sources is introduced into said light guides through at least one end surface of each light guide,
- wherein the light guides are connected to one another through the light source accommodating portions,
- wherein each of the plurality of connectors is provided with one connection portion for holding the light guide and a body portion in which the light source is accommodated as the light source accommodating portion, and
- wherein the connectors are fixed to the at least one junction block at the connector attachment surfaces, so that at least two light guides are connected to one another.

7. The linear luminous structure according to claim 6, wherein the connector attachment surfaces are disposed at vectorial angles different from one another.

8. The linear luminous structure according to claim 6, wherein a pull-off prevention portion is provided at end portions of said connection portion, and said pull-off prevention portion comprises:
- a stopper fixed to the body portion; and
- a piston ring for holding said light guide,
- wherein when said piston ring is pressed into said stopper, said piston ring is engaged with said stopper to thereby disengage said stopper from said light guide.

9. The linear luminous structure according to claim 6, further comprising a plurality of junction blocks that are connected to one another by a coupling member.

10. The linear luminous structure according to claim 6, wherein an engagement projection is provided on at least one of said plurality of connectors and an attachment recess is provided on each of the connector attachment surfaces, and the engagement projection is inserted into the attachment recess so that the connector is fixed to the at least one junction block.

11. The linear luminous structure according to claim 10, wherein the engagement projection is formed across opposite side faces of the connector.

12. The linear luminous structure according to claim 10, wherein the attachment recess comprises a groove across opposite faces of the joint block.

* * * * *